Nov. 11, 1969   K. N. COSTANZO   3,477,409
ANIMAL DEODORIZING COLLAR ATTACHMENT
Filed Oct. 20, 1967
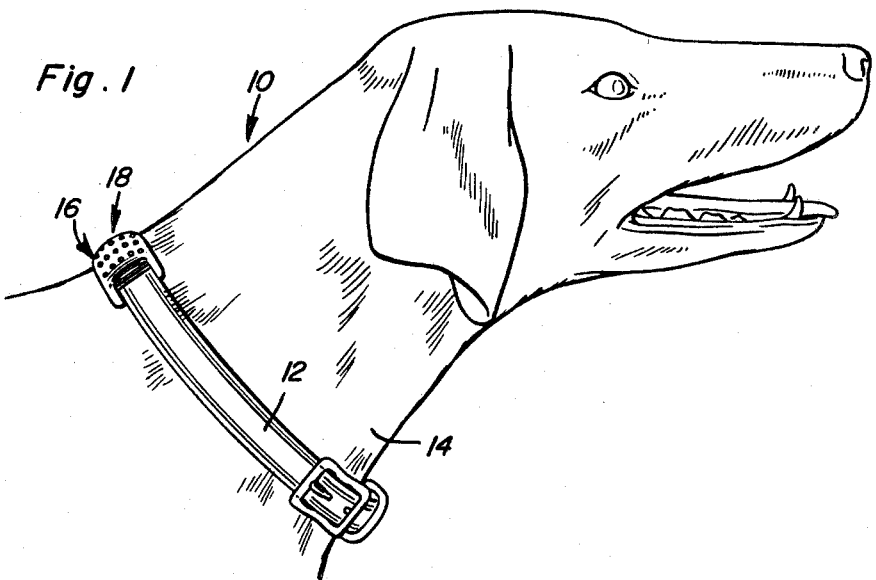
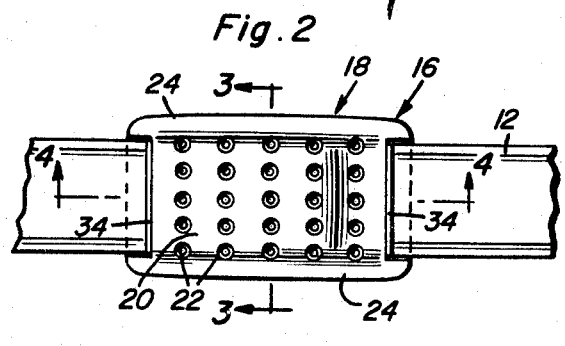
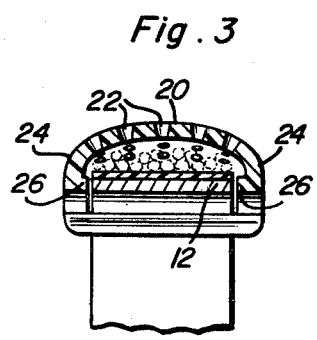
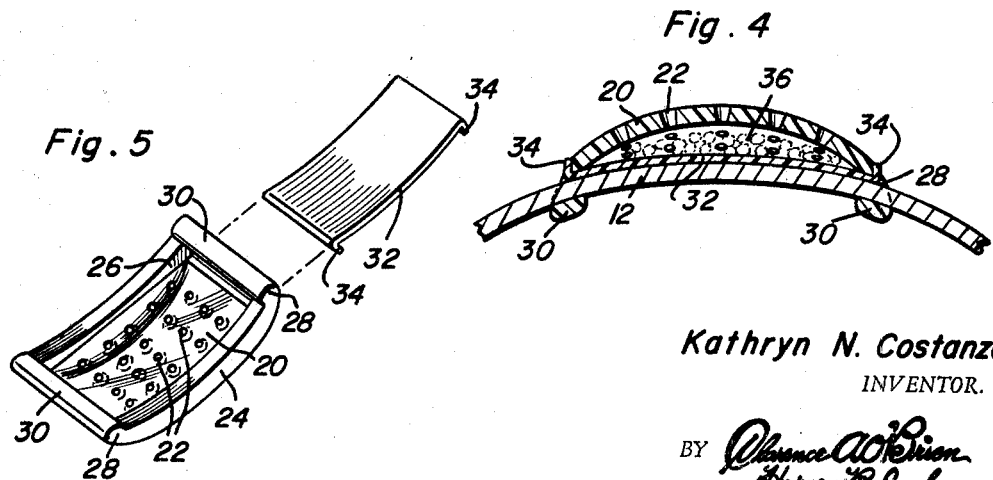
Kathryn N. Costanzo
INVENTOR.

United States Patent Office 3,477,409
Patented Nov. 11, 1969

3,477,409
ANIMAL DEODORIZING COLLAR ATTACHMENT
Kathryn N. Costanzo, 18 Bent Ave.,
Port Chester, N.Y. 10573
Filed Oct. 20, 1967, Ser. No. 676,966
Int. Cl. A01k 29/00
U.S. Cl. 119—106                                    9 Claims

ABSTRACT OF THE DISCLOSURE

An elongated and slightly arcuate housing or receptacle including portions at its opposite ends adapted to snugly and slidably receive longitudinally spaced portions of an animal collar therethrough and including a closure for the receptacle which is automatically retained in the closed position by the receptacle being mounted upon an associated collar, certain wall portions of the receptacle being provided with vapor passages whereby vapors from a deodorizing agent disposed within the receptacle may pass to the exterior of the latter.

---

The attachment of the instant invention comprises an improvement over the Deodorizing Dog Collar disclosed in my prior U.S. Patent No. 2,808,030, dated Oct. 1, 1957. The attachment of the instant invention has been designed with simplicity of construction and ease of use as well as efficient operation as major objectives. In addition, the attachment has been constructed whereby a deodorizing agent in any solid form and of suitable size may be received within the receptacle and readily replaced when depleted or exhausted. Further, although the attachment comprises a receptacle in which a deodorizing agent may be placed and is constructed in a manner whereby the deodorizing agent may be removably held captive within the receptacle, the receptacle is constructed free of catches or latches in the form of movable or flexible portions of the attachment operative to releasably retain the removable closure panel for the receptacle in the closed position. The attachment of the instant invention utilizes the collar upon which the attachment is mounted as the means by which the closure for the receptacle is locked in the closed position.

The main object of this invention is to provide an animal collar attachment in the form of a receptacle which may be utilized to contain a deodorizing agent and to slowly release vapors from the deodorizing agent.

A further object of this invention is to provide an attachment in accordance with the preceding object and constructed of transparent material whereby the depletion of a vaporizable deodorizing agent within the receptacle may be readily determined.

Yet another object of this invention is to provide an attachment in accordance with the preceding objects and which may be readily constructed so as to be adapted to be utilized in conjunction with collars of different sizes and shapes.

A final object of this invention to be specifically enumerated herein is to provide an animal deodorizing collar attachment in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the head and neck portions of a dog with a collar upon which the attachment of the instant invention has been mounted encircling the neck of the dog;

FIGURE 2 is a top plan view of the attachment;

FIGURE 3 is an enlarged fragmentary sectional view taken substantially upon the plane indicated by the section line 3—3 of FIGURE 2;

FIGURE 4 is an enlarged sectional view taken substantially upon the plane indicated by the section line 4—4 of FIGURE 2; and FIGURE 5 is an exploded perspective view of the attachment.

Referring now more specifically to the drawings, the numeral 10 generally designates a dog having a conventional collar 12 secured about his neck 14. From FIGURE 3 of the drawings it may be seen that the collar 12 is generally rectangular. The deodorizing collar attachment is generally referred to by the reference numeral 16 and is mounted on the collar 12.

The attachment 16 defines an elongated downwardly opening hollow receptacle generally referred to by the reference numeral 18 and including a top wall portion 20. The top wall portion 20 is longitudinally bowed as can best be seen from FIGURE 4 of the drawings as well as slightly transversely bowed as can best be seen from FIGURE 3 of the drawings and has a plurality of deodorizing vapor passages 22 formed therethrough. The opposite side edge portions of the top wall panel 20 terminate in downwardly directed side walls 24 whose lower longitudinal edge portions terminate in inwardly directed flange portions 26 extending longitudinally of the receptacle 18.

The opposite ends of the top wall panel 20 and the side walls 24 merge to define a pair of opposite side extensions 28 at each end of the receptacle 18. The extensions 28 project endwise outwardly from opposite sides of the top wall panel 20 at opposite ends thereof and the free ends of the extensions 28 disposed at each end of the top wall panel 20 are interconnected by means of an integral transverse member 30. As can best be seen from FIGURES 4 and 5 of the drawings, the extensions 28, the transverse members 30 and the opposite end transverse edge portions of the top wall panel 20 coact to form generally aligned longitudinally extending and transversely widened sleeve areas.

A bottom closure panel 32 is provided and is slightly longitudinally bowed as will be evident from FIGURES 4 and 5. The closure panel 32 includes opposite end upturned flange portions 34 and the receptacle 18 may be inverted, filled with a deodorizing agent 36 and then the bottom closure panel 32 may be inserted endwise through one of the sleeve areas until the opposite ends of the closure panel 32 project into both ends of the sleeve areas. Thereafter, the inverted closure panel 32 may be downwardly displaced so as to snugly receive the opposite end edge portions of the top wall panel 20 between the flanges or flange portions 34. Thereafter, the free end portion of the collar 12 may be inserted through the sleeve areas over the inverted closure panel 32 in the manner illustrated in FIGURE 4 of the drawings. The opposite end portions of the closure panel 32 serve to vertically narrow the sleeve area so that the latter may snugly receive the collar 12 therethrough at points spaced longitudinally therealong and accordingly, the collar 12 serves to releasably retain the closure panel 32 against lateral displacement away from the top wall panel 20. Of course, by receiving the opposite ends of the top wall panel 30 snugly between the flanges 34, the closure panel 32 is prevented against longitudinal displacement relative to the receptacle 18.

With attention again invited to FIGURE 4 of the drawings it is to be understood that the end edge portions of the top wall panel 20 are slightly upwardly convergent when the receptacle 18 is disposed upright and therefore that the stiff but resilient flanges 34 carried by the closure panel 32, "snap" into engagement with the end edge portions of the receptacle 18. Of course, the longitudinal edge portions of the closure panel 32 are snugly received between the opposing longitudinal edge portions of the inturned flanges 26 and therefore the bottom of the receptacle 18 is substantially fully closed when the closure panel 32 is in the position thereof illustrated in FIGURE 4. Further, the attachment 16 snugly and slidably receives the collar 12 through its sleeve areas defined between the opposite ends of the closure panel 32 and the transverse members 30 and therefore is operative to frictionally retain itself in position on the collar 12 and yet be readily removable therefrom and therefore also readily mountable on a collar.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An animal deodorizer collar attachment, said attachment comprising an elongated downwardly opening hollow receptacle including a top wall portion having upstanding vapor passage means extending therethrough, said receptacle defining a pair of aligned longitudinally extending and transversely widened sleeve areas at opposite ends of said receptacle, a removable bottom panel member extending across and at least substantially closing the lower end of said receptacle, said sleeve areas being adapted to snugly receive longitudinally spaced portions of a collar therethrough with the section along which said portions are spaced being substantially straight and disposed immediately beneath said removable panel member.

2. The combination of claim 1 wherein the opposite end portions of said panel member extend at least partially into said sleeve areas and serve to reduce the height of said sleeve areas to snugly receive said spaced portions of said collar therethrough.

3. The combination of claim 2 wherein said panel member and receptacle include coacting abutment portions opposing each other and facing generally longitudinally of said receptacle movable into registry with each other upon lateral final positioning of said panel member toward said top wall portion into position closing the bottom of said receptacle, said coacting abutment portions, when in registry serving to prevent longitudinal shifting of said panel relative to said receptacle.

4. The combination of claim 3 wherein said coacting abutment portions include upwardly directed flange portions carried by the opposite ends of said bottom panel and opposite end surface portions of said receptacle snugly removably received between said flange portions when said panel is in position closing the bottom of said receptacle.

5. The combination of claim 4 wherein said top wall portion is longitudinally bowed so as to be upwardly convexed, said opposed end surface portions comprising the opposite end edges of said top wall portion.

6. The combination of claim 5 wherein said panel is slightly longitudinally bowed so as to be upwardly convexed, the radius of curvature of said top wall portion being less than the radius of curvature of said bottom wall.

7. The combination of claim 1 wherein said receptacle and panel are constructed of transparent material.

8. An animal deodorizing collar attachment, said attachment comprising an elongated downwardly opening hollow receptacle including a top wall portion having upstanding vapor passage means extending therethrough, said receptacle defining a pair of aligned longitudinally extending and transversely widened sleeve areas at opposite ends of said receptacle, a removable bottom panel member extending across and at least substantially closing the lower end of said receptacle, said sleeve areas being adapted to snugly receive longitudinally spaced portions of a collar therethrough with the section along which said portions are spaced being substantially straight and disposed immediately beneath said removable panel member, the opposite end portions of said panel member extending at least partially into said sleeve areas and serving to reduce the height of said sleeve areas to snugly receive said spaced portions of said collar therethrough, said panel member and receptacle including coacting abutment portions opposing each other and facing generally longitudinally of said receptacle movable into registry with each other upon lateral final positioning of said panel member toward said top wall portion into position closing the bottom of said receptacle, said coacting abutment portions, when in registry serving to prevent longitudinal shifting of said panel relative to said receptacle, said receptacle including longitudinally extending side walls projecting downwardly from opposite side edge portions of said top wall portion, said bottom panel being snugly received between the lower marginal edge portions of said side walls.

9. The combination of claim 8 wherein said lower marginal edge portions include inturned flange portions extending along their lower marginal edge portions, said bottom panel being received between said inturned flange portions.

References Cited

UNITED STATES PATENTS

| | | | |
|---|---|---|---|
| 1,127,249 | 2/1915 | Hughes | 119—106 |
| 1,780,407 | 11/1930 | Smith | 239—36 |
| 2,808,030 | 10/1957 | Costanzo | 119—106 |

HUGH R. CHAMBLEE, Primary Examiner